(12) United States Patent
Tsirkin et al.

(10) Patent No.: US 9,001,050 B2
(45) Date of Patent: Apr. 7, 2015

(54) TOUCH SCREEN EMULATION FOR A VIRTUAL MACHINE

(75) Inventors: Michael Tsirkin, Yokneam Yillit (IL); Izik Eidus, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 901 days.

(21) Appl. No.: 12/838,972

(22) Filed: Jul. 19, 2010

(65) Prior Publication Data

US 2012/0013547 A1    Jan. 19, 2012

(51) Int. Cl.
*G06F 3/041* (2006.01)
*G06F 9/455* (2006.01)

(52) U.S. Cl.
CPC .. *G06F 9/45558* (2013.01); *G06F 2009/45579* (2013.01)

(58) Field of Classification Search
CPC ....... G06F 3/048; G06F 15/173; G06F 9/455; G06F 15/16; G06F 16/16

USPC .................................. 425/173; 715/700–866
See application file for complete search history.

(56) References Cited

U.S. PATENT DOCUMENTS

| | | | |
|---|---|---|---|
| 2009/0172086 A1* | 7/2009 | Arthursson et al. | 709/203 |
| 2010/0138780 A1* | 6/2010 | Marano et al. | 715/804 |

* cited by examiner

*Primary Examiner* — Tony N Ngo
(74) *Attorney, Agent, or Firm* — Lowenstein Sandler LLP

(57) ABSTRACT

A mechanism for touch screen emulation for a virtual machine is disclosed. A method of the invention includes providing an emulation of a touch screen device to a virtual machine (VM) managed by a hypervisor for emulation of the touch screen device by the VM, receiving touch gesture information related to a touch gesture received in the session window of the VM that is managed by the hypervisor, sending an interrupt to the VM that informs the VM of detected touch screen activity in the session window of the VM on the touch screen device, wherein in response to the interrupt the VM receives the touch gesture information in order to utilize in determining screen coordinates of the touch gestures within the session window of the VM.

20 Claims, 4 Drawing Sheets

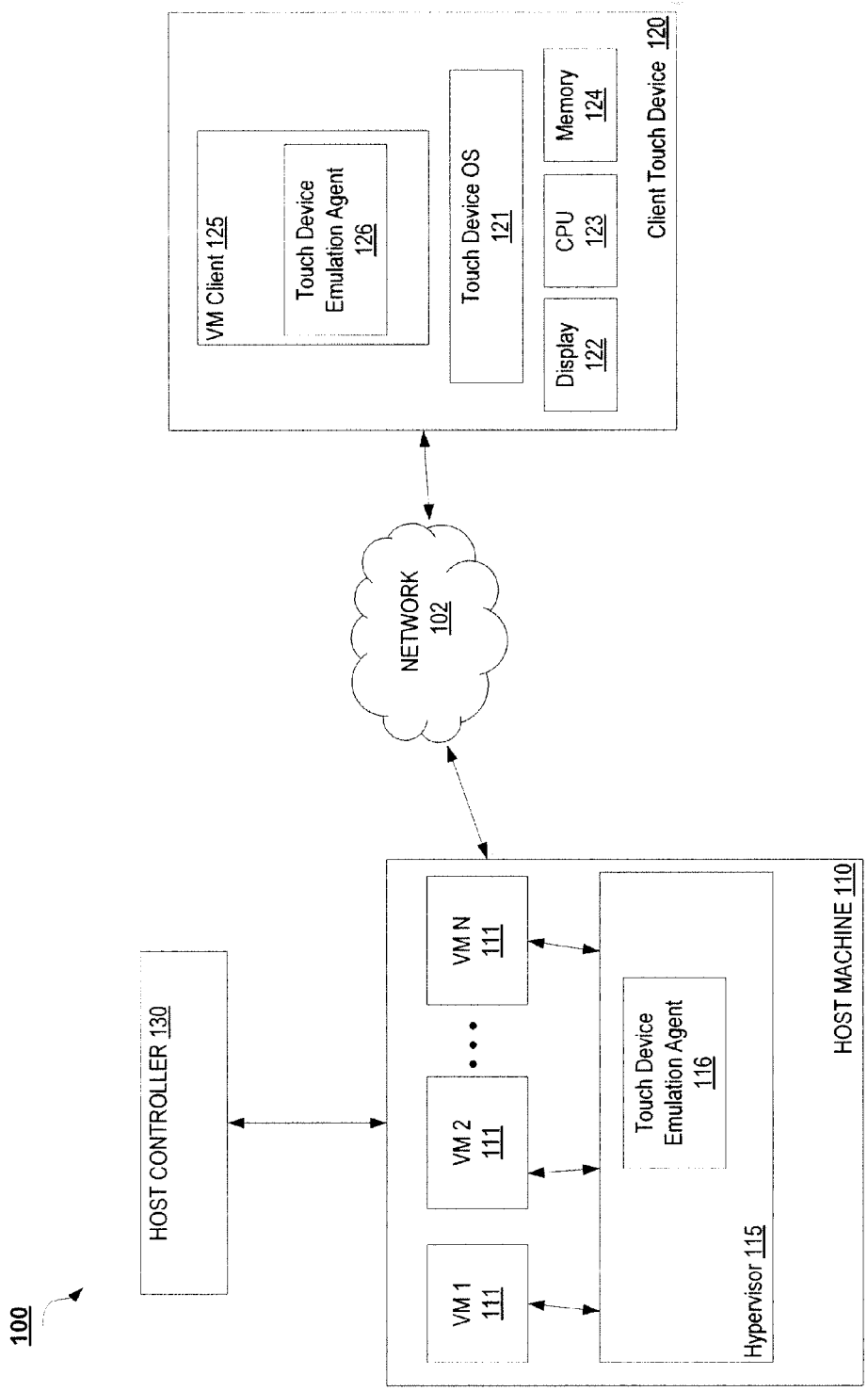

200

Upon initialization of client touch screen device, signal OS of touch screen device to hide on-screen keyboard that is typically provided by the touch screen device OS
210

Register VM client with the touch screen device OS to receive information on touch gestures captured by the touch screen device
220

Receive information on one or more touch gestures made by an end user of the touch screen device and captured by the touch screen device OS
230

Calculate offset of the one or more touch gestures within a VM client window displayed on the display of the touch screen device
240

Send calculated offset information and optionally information on the duration of touch of the one or more touch gestures to a VM hypervisor associated with the VM represented in the VM client window
250

```
┌─────────────────────────────────────────────────────────────────────┐
│ Present a touch screen device to a VM for emulation by the VM upon an │
│         enumeration operation during initialization of the VM       │
│                                                                 310 │
└─────────────────────────────────────────────────────────────────────┘
                                   │
                                   ▼
┌─────────────────────────────────────────────────────────────────────┐
│ Receive, from a VM client on a touch screen device, touch gesture offset │
│ information and, optionally, touch gesture duration information related to a touch │
│   gesture in a VM session window displayed on the touch screen device │
│                                                                 320 │
└─────────────────────────────────────────────────────────────────────┘
                                   │
                                   ▼
┌─────────────────────────────────────────────────────────────────────┐
│ Send interrupt to VM associated with the VM session window receiving the touch │
│   gesture, the interrupt telling the VM that the emulated touch screen device │
│                    detected touch screen activity                   │
│                                                                 330 │
└─────────────────────────────────────────────────────────────────────┘
                                   │
                                   ▼
┌─────────────────────────────────────────────────────────────────────┐
│             Receive the touch gesture offset information at the VM  │
│                                                                 340 │
└─────────────────────────────────────────────────────────────────────┘
                                   │
                                   ▼
┌─────────────────────────────────────────────────────────────────────┐
│    Determine the screen coordinates of the touch gesture within the VM session │
│                                 window                              │
│                                                                 350 │
└─────────────────────────────────────────────────────────────────────┘
                                   │
                                   ▼
┌─────────────────────────────────────────────────────────────────────┐
│  Interpret the intention of the end user's touch gesture and respond appropriately │
│                                                                 360 │
└─────────────────────────────────────────────────────────────────────┘
```

*Fig. 3*

TOUCH SCREEN EMULATION FOR A VIRTUAL MACHINE

TECHNICAL FIELD

The embodiments of the invention relate generally to virtualization systems and, more specifically, relate to a mechanism for touch screen emulation for a virtual machine.

BACKGROUND

Traditionally, a virtual machine (VM) hypervisor includes an emulation capability for user input devices, such as a mouse and a keyboard. This emulation capability gives the VM the impression that it is attached to and controlling actual physical user input devices, when in fact these devices are attached to the physical client device that the end user logs into the VM from. The VM itself can be either local or remote to the physical client device, but most likely is remote to the device.

In the case of touch screen devices (also known as touch devices), they typically do not have physically separate end user input devices. Instead, these touch devices have the capability to translate an end user's touches on a screen of the touch device to input commands that are similar to key presses or mouse input. Furthermore, touch devices are being utilized more frequently to view sessions running on VMs.

Currently, the on-screen keyboard provided by the operating system (OS) of the touch device is utilized as the input device for the VM. Any key press indications or other touch commands received on the touch screen are converted into mouse and keyboard events, and these events are forwarded on to the VM. At this point, the hypervisor managing the VM utilizes this event information for the emulation function of the VM.

Unfortunately, this setup presents some difficulties. When viewing and interacting with a VM via the touch screen device, the VM is presented in its own window display, with control of the contents of that window provided by the VM itself. The touch screen keyboard provided by the touch screen device OS cannot be displayed within this VM window as it is not controlled or provided by the touch screen OS.

As a result, if the VM window is launched into a full screen size, there is no place to display the touch screen keyboard provided by the touch device OS. The VM window can be re-sized to allow display of both the VM window and the touch screen keyboard, but this is a cumbersome process and often times does not result in an aesthetically pleasing view on the touch screen.

Another problem is that some gestures might not translate well to mouse and keyboard events. Such events are normally interpreted by the touch device and not forwarded to the VM. For example, a zoom gesture would be interpreted as zooming the whole VM session window, when the reasonable expectation by the user may be to only zoom the specific application window with the VM session window.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

FIG. 1 is a block diagram of a virtualization system for providing touch screen emulation at a virtual machine (VM) according to an embodiment of the invention;

FIG. 2 is a flow diagram illustrating a method performed by a VM client for touch screen emulation for a VM according to an embodiment of the invention;

FIG. 3 is a flow diagram illustrating a method, performed by a host machine of one or more VMs, for touch screen emulation for a VM according to an embodiment of the invention.

DETAILED DESCRIPTION

Figure 4:
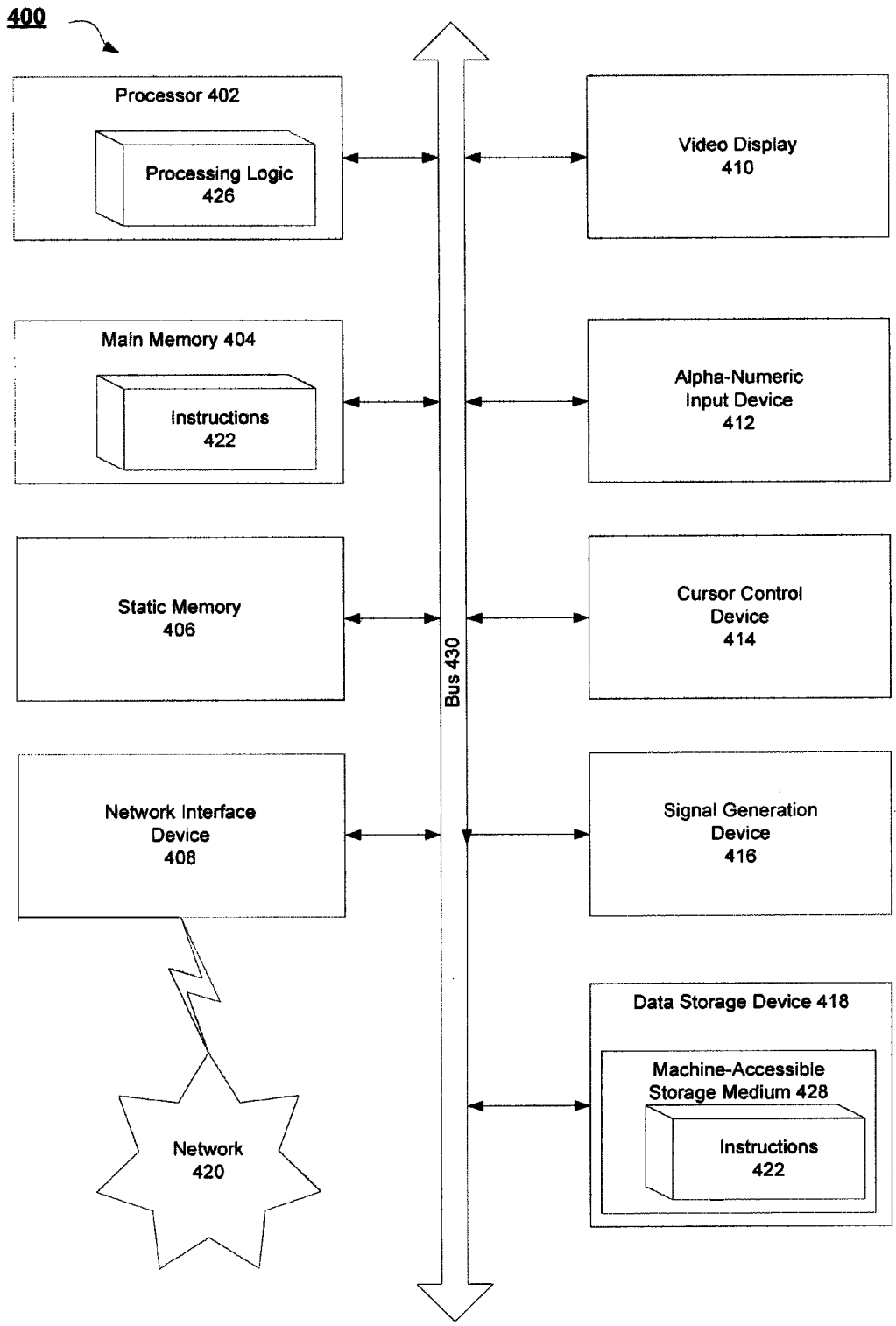
FIG. 4 illustrates a block diagram of one embodiment of a computer system.

Embodiments of the invention provide a mechanism for touch screen emulation for a virtual machine. A method of embodiments of the invention includes providing an emulation of a touch screen device to a virtual machine (VM) managed by a hypervisor for emulation of the touch screen device by the VM, receiving touch gesture information related to a touch gesture received in the session window of the VM that is managed by the hypervisor, sending an interrupt to the VM that informs the VM of detected touch screen activity in the session window of the VM on the touch screen device, wherein in response to the interrupt the VM receives the touch gesture information in order to utilize in determining screen coordinates of the touch gestures within the session window of the VM.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "determining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for touch screen emulation for a virtual machine (VM) via a VM client and VM hypervisor. Embodiments of the invention replace a touch screen device's own emulation of a keyboard for a VM with an emulation of the keyboard controlled by the VM. A touch screen device as discussed herein may refer to any device capable of recognizing touch gestures, and does not have to be limited to those device where a touch screen is integrated into the display screen. For example, devices exist that have a touch pad separate from the display.

Specifically, a VM client on the touch device is modified to capture touch gestures directly, and to hide the touch device OS's on-screen keyboard. In addition, the VM hypervisor is modified to provide touch device emulation by obtaining data regarding gestures from the touch device user and passing this data onto the VM OS as if it were coming from the real touch device. The result is that a VM OS is able to display its own on-screen keyboard in the VM window and can interpret other touch gestures in its own way native to the VM.

FIG. 1 is a block diagram of a virtualization system 100 for providing touch screen emulation at the VM according to an embodiment of the invention. Virtualization system 100 includes a host machine 110 coupled to a client device 120 over a network 102. The network 102 may be a private network (e.g., a local area network (LAN), wide area network (WAN), intranet, etc.) or a public network (e.g., the Internet). In some embodiments, client 120 may be hosted directly by a host machine 110 as a local client on host machine 110. Host machine 110 may be part of a cluster of host machines 110. In addition, host machine 110 may be coupled to a host controller 130 (via a network or directly). Alternatively, the host controller 130 may be part of the host machine 110.

In one embodiment, the client 120 may include a computing device that has a wide range of processing capabilities. Clients 120 may be a thin client, which serves as an access terminal for users and depends primarily on the host machine 110 for processing activities. For example, the client 120 may be a desktop computer, laptop computer, cellular phone, personal digital assistant (PDA), etc. The client 120 may include a CPU 123 and memory 124 and run client applications such as a Web browser and a graphic user interface (GUI). The client 120 may also run other client applications to receive multimedia data streams or other data sent from the host machine 110 and re-direct the received data to a display or other user interface.

Furthermore, assume for purposes of explanation of embodiments of the invention, that client 120 is a touch screen device that does not include separately-attached keyboard or mouse hardware. Rather, the keyboard and mouse functions are provided on-screen 122 by the client 120 and are responsive to touch gestures made by an end user of the client 120.

In one embodiment, host machine 110 runs one or more VMs 111. Each VM 111 runs a guest operating system (OS) that may be different from one another. The guest OS may include Microsoft Windows, Linux, Solaris, Mac OS, etc. The host machine 110 may include a hypervisor 115 that emulates the underlying hardware platform for the VMs 111. The hypervisor 115 may also be known as a virtual machine monitor (VMM), a kernel-based hypervisor or a host operating system.

One or more of VMs 111 may be accessed by client 120 over the network 102. In one scenario, the VM 111 can provide a virtual desktop for the client 120. In other embodiments, the VM 111 may provide a virtual server for the client 120. The VMs 111 can be managed by the host controller 105, which may reside on a designated computer system (e.g., a server computer, a desktop computer, etc.) or be part of the host machine 110 or another machine. The host controller 105 may also add a VM, delete a VM, balance the load on the server cluster, provide directory service to the VMs 111, and perform other management functions.

Embodiments of the invention enhance the emulation of user input hardware associated with the VM 111. More specifically, embodiments of the invention emulate a touch screen keyboard of the client device 120 at the VM 111, instead of at the client 120. To accomplish embodiments of the invention, a client 125 for the VM 111 on the touch device 120 is modified. This VM client 125 is modified to include a touch device emulation agent 126. This agent 126 operates so that when the client 125 is started, the agent 126 signals the touch screen device OS 121 that the on-screen keyboard provided by the OS 121 is not needed and can be hidden. Instead, an on-screen keyboard will be emulated by the VM 111 and presented on the touch device 120 within the window of the VM session.

The VM client touch device emulation agent 126 also registers the VM client 125 with the touch screen device OS 121, so that the VM client 125 will receive information about on-screen touches made by an end user of the device 120 on the on-screen keyboard emulated by the VM 111 and presented within the VM session window. When an end user touches a screen 122 of the device, the VM client 125, and thereby agent 126, receives this information. The VM client agent 126 calculates the offset of the place, or places, touched, within the VM client window. For example, if the VM client window is located at coordinates A, B on the display screen 122, then the screen touch as coordinates a, b will be translated to offset X=(a−A, b−B). For each touch to the screen 122, VM client 125 sends to the VM hypervisor 115 an event with the information about offsets of the places touched, and, optionally, duration of each touch.

On the host machine 110 side, the VM hypervisor 115 is modified by embodiments of the invention to allow for emulation of the touch screen keyboard by the VM 111. When a VM 111 performs enumeration (for example at VM boot), the hypervisor 115 presents a touch screen device to the VM 111 via a touch device emulation agent 116. This touch screen device could be presented as a Peripheral Component Interconnect (PCI) device, a Universal Serial Bus (USB) device, or an emulation of any other kind of bus device. The VM, in turn, emulates an on-screen keyboard which is presented on the touch device 120 within the window of the VM session Subsequently, when a touch event in the VM session window is received from the VM client 125, which encodes touch as offset X with duration T, the touch device emulation agent 116 of hypervisor 115 sends the VM 111 an interrupt telling the VM 111 that the emulated device detected touch screen activity on the client touch device 120. At this point, the touch device emulation agent 116 can send the VM 111 an event relaying the offset information of the detected screen touch at location X, and optionally with information on the time duration T of the detected screen touch. That offset is then interpreted as screen coordinates by the VM 111, and used to determine a particular key press or other control gesture conveyed by the end user of the touch device 120. Other control gestures may include, but are not limited to, a close window gesture, a resize window gesture, a move window gesture, a selection gesture, a zoom in gesture, and a zoom out gesture.

In other embodiments, the VM 111 may instead query the touch device 120 for the touch gesture information, and the device 120 subsequently responds with information regarding the touch gesture information, such as the device-detected screen touch at location X, with time T. That offset is then interpreted as screen coordinates by VM 111, and used to determine a particular key press or other control gesture conveyed by the end user of the touch device 120.

Embodiments of the invention allow a VM 111 to respond more seamlessly to touch gestures in a VM window on a touch device. For example, an on-screen keyboard on the touch device that is emulated and presented by the VM 111 within the VM session window on the client device 120 will have a look, feel, and placement that is consistent with other windows running on the VM 111. Furthermore, zoom gestures can act on a single window of the VM session that has focus instead of on all of the windows of the whole VM session. Additionally, special gestures, such as page flipping close, can be supported with more precision because of embodiments of the invention.

FIG. 2 is a flow diagram illustrating a method 200 performed by a VM client for touch screen emulation for a VM according to an embodiment of the invention. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by VM client 125 of FIG. 1.

Method 200 begins at block 210 where the OS of a touch screen device is signaled to hide an on-screen keyboard upon initialization of the touch screen device. This on-screen keyboard is typically provided by the touch screen OS for display and interaction with an end user of the touch screen OS. Then, at block 220, a VM client is registered with the touch screen device OS in order to receive information from the OS regarding touch gestures captured by the touch screen device.

At block 230, information is received at the VM client about one or more touch gestures made by the end user of the touch device on the touch screen of the device. These gestures are captured by the touch screen device OS and sent to the VM client per the registration of block 220. In response to the received touch gesture information, the VM client calculates an offset of the one or more touch gestures at block 240. This offset is with respect to a VM client window displayed on the touch screen device. For example, if the VM client window is located at coordinates A, B on the display screen, then a screen touch at coordinates a, b will be translated to offset X=(a−A, b−B).

Lastly, at block 250, the calculated offset information for the one or more touch gestures is sent to a VM hypervisor that is associated with the VM represented by the VM client window. In addition, in some embodiments, information on the duration of the one or more touch gestures is also sent to the VM hypervisor.

FIG. 3 is a flow diagram illustrating a method 300, performed by a host machine of one or more VMs, for touch screen emulation for a VM according to an embodiment of the invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by hypervisor 115 running on a host machine 110 of FIG. 1.

Method 300 begins at block 310 where a touch screen device is presented by a hypervisor to a VM for emulation by the VM. In one embodiment, this touch screen device is presented to the VM at an enumeration operation of the VM during its initialization. The VM utilizes this emulated touch device to provide an on-screen keyboard within a VM session window on the touch device. Then, at block 320, touch gesture offset information is received from a VM client on a touch screen device that is being emulated at the VM. The touch gesture is received in a VM session window that is being displayed on the touch screen device. In some embodiments, duration information of the touch gesture is also sent. This touch gesture offset information and duration information is received by a hypervisor managing the VM.

Subsequently, at block 330, an interrupt is sent from the hypervisor to the VM that is associated with VM session window receiving the touch gesture. The interrupt informs the VM that the emulated touch screen device detected touch screen activity. In response to the interrupt, the VM receives the touch gesture information via the hypervisor at block 340. In one embodiment, the VM receives an event relaying the offset information of the detected screen touch at location X, and optionally, information on the time duration T of the detected screen touch. In other embodiments, the VM may instead directly query the touch device for the touch gesture information, and the device subsequently responds with the information.

At block 350, the VM determines the screen coordinates of the touch gesture within the VM session window. Then, at block 360, the VM can interpret the intention of the end user's touch gesture (i.e., a particular letter the end user typed, an indication to close or resize a window, etc.) and respond appropriately to this touch gesture.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428 on which is stored one or more set of instructions (e.g., software 422) embodying any one or more of the methodologies of functions described herein. For example, software 422 may store instructions to perform touch screen emulation for a VM by host machine 110 and/or touch device 120 described with respect to FIG. 1. The software 422 may also reside, completely or at least partially, within the main memory 404 and/or within the processing device 402 during execution thereof by the computer system 400; the main memory 404 and the processing device 402 also constituting machine-accessible storage media. The software 422 may further be transmitted or received over a network 420 via the network interface device 408.

The machine-readable storage medium 428 may also be used to store instructions to perform methods 200 and 300 for touch screen emulation for a VM described with respect to FIGS. 2 and 3, and/or a software library containing methods that call the above applications. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
providing, by a hypervisor executed by a processing device on a host machine, an emulation of a touch screen device of a client device separate from the host machine, the emulation provided to a virtual machine (VM) managed by the hypervisor, wherein the provided emulation utilized by the VM for emulation of the touch screen device in a session window of the VM displayed to a user of the VM at the client device, and wherein a local on-screen presentation of the touch screen device provided by an operating system (OS) of the client device is hidden in response to the emulation of the touch screen device in the session window of the VM, and wherein functionality provided by the local on-screen presentation of the touch screen device is replaced by the emulation of the touch screen device for use by the user of the client device;
receiving, by the hypervisor, touch gesture information related to a touch gesture received from the user in the session window of the VM; and
sending, by the hypervisor, an interrupt to the VM that notifies the VM of detected touch screen activity in the session window of the VM on the touch screen device, wherein in response to the interrupt, the VM receives the touch gesture information to utilize in determining screen coordinates of the touch gestures within the session window of the VM;
wherein the touch gesture information comprises an offset of the touch gesture within the session window of the VM, the offset calculated by a VM client operating on the client device and assisting in display of the session window of the VM at the client device.

2. The method of claim 1, wherein the VM further utilizes the received touch gesture information to:
interpret an intention of the touch gesture with respect to the VM, and
respond to the interpreted intention of the touch gesture.

3. The method of claim 1, wherein the touch screen device emulation causes an on-screen keyboard to be displayed within a VM session window of a touch screen device.

4. The method of claim 1, wherein the touch gesture information further comprises at least one of a duration of the touch gesture or an orientation of the touch device.

5. The method of claim 1, wherein the VM client registers with the OS of the touch screen device in order to receive information on all touch gestures detected by the OS of the touch screen device.

6. The method of claim 4, wherein the VM client instructs the OS of the touch screen device to hide an on-screen keyboard that is provided to end users of the touch screen device.

7. The method of claim 1, wherein the VM receives the touch gesture information by at least one of receiving the touch gesture information from a VM client operating on the touch screen device or pulling the touch gesture information from the VM client operating on the touch screen device.

8. The method of claim 1, wherein the touch gestures is at least one of a key press on an on-screen keyboard of the touch screen device, a close window gesture, a resize window gesture, a move window gesture, a selection gesture, a zoom in gesture, or a zoom out gesture.

9. A system, comprising:
a processing device;
a memory communicably coupled to the processing device; and
a hypervisor to execute one or more virtual machines (VMs) from the memory that share use of the processing device, the hypervisor to:
provide an emulation of a touch screen device of a client device separate from the system, the emulation provided to a virtual machine (VM) managed by the hypervisor, wherein the provided emulation utilized by the VM for emulation of the touch screen device in a session window of the VM displayed to a user of the VM at the client device, and wherein a local on-screen presentation of the touch screen device provided by an operating system (OS) of the client device is hidden in response to the emulation of the touch screen device in the session window of the VM, and wherein functionality provided by the local on-screen presentation of the touch screen device is replaced by the emulation of the touch screen device for use by the user of the client device;
receive touch gesture information related to a touch gesture received from the user in the session window of the VM; and
send an interrupt to the VM that notifies the VM of detected touch screen activity in the session window of the VM on the touch screen device, wherein in response to the interrupt, the VM receives the touch gesture information to utilize in determining screen coordinates of the touch gestures within the session window of the VM;
wherein the touch gesture information comprises an offset of the touch gesture within the session window of the VM, the offset calculated by a VM client operating on the client device and assisting in display of the session window of the VM at the client device.

10. The system of claim 9, wherein the VM further utilizes the received touch gesture information to:
interpret an intention of the touch gesture with respect to the VM, and
respond to the interpreted intention of the touch gesture.

11. The system of claim 9, wherein the touch screen device emulation causes an on-screen keyboard to be displayed within a VM session window of a touch screen device.

12. The system of claim 9, wherein the touch gesture information further comprises at least one of a duration of the touch gesture or an orientation of the touch device.

13. The system of claim 9, wherein the VM client registers with the OS of the touch screen device in order to receive information on all touch gestures detected by the OS of the touch screen device.

14. The system of claim 9, wherein the VM receives the touch gesture information by at least one of receiving the touch gesture information from a VM client operating on the touch screen device or pulling the touch gesture information from the VM client operating on the touch screen device.

15. The system of claim 9, wherein the touch gestures is at least one of a key press on an on-screen keyboard of the touch screen device, a close window gesture, a resize window gesture, a move window gesture, a selection gesture, a zoom in gesture, or a zoom out gesture.

16. A non-transitory machine-readable storage medium including data that, when accessed by a processing device, cause the processing device to perform operations comprising:
providing, by a hypervisor executed by the processing device on a host machine, an emulation of a touch screen device of a client device separate from the host machine, the emulation provided to a virtual machine (VM) managed by the hypervisor, wherein the provided emulation utilized by the VM for emulation of the touch screen device in a session window of the VM displayed to a user of the VM at the client device, and wherein a local on-screen presentation of the touch screen device provided by an operating system (OS) of the client device is hidden in response to the emulation of the touch screen device in the session window of the VM, and wherein functionality provided by the local on-screen presentation of the touch screen device is replaced by the emulation of the touch screen device for use by the user of the client device;
receiving touch gesture information related to a touch gesture received from the user in the session window of the VM; and
sending an interrupt to the VM that notifies the VM of detected touch screen activity in the session window of the VM on the touch screen device, wherein in response to the interrupt, the VM receives the touch gesture information to utilize in determining screen coordinates of the touch gestures within the session window of the VM;
wherein the touch gesture information comprises an offset of the touch gesture within the session window of the VM, the offset calculated by a VM client operating on the client device and assisting in display of the session window of the VM at the client device.

17. The non-transitory machine-readable storage medium of claim 16, wherein the VM further utilizes the received touch gesture information to:
interpret an intention of the touch gesture with respect to the VM, and
respond to the interpreted intention of the touch gesture.

18. The non-transitory machine-readable storage medium of claim 16, wherein the touch screen device emulation causes an on-screen keyboard to be displayed within a VM session window of a touch screen device.

19. The non-transitory machine-readable storage medium of claim 16, wherein the touch gesture information further comprises at least one of a duration of the touch gesture or an orientation of the touch device.

20. The non-transitory machine-readable storage medium of claim 16, wherein the VM client registers with the OS of the touch screen device in order to receive information on all touch gestures detected by the OS of the touch screen device.

* * * * *